(12) United States Patent
Hentz

(10) Patent No.: US 11,433,465 B2
(45) Date of Patent: Sep. 6, 2022

(54) RING CUTTING JIG

(71) Applicant: Christopher A. Hentz, Baton Rouge, LA (US)

(72) Inventor: Christopher A. Hentz, Baton Rouge, LA (US)

( * ) Notice: Subject to any disclaimer, the term of this patent is extended or adjusted under 35 U.S.C. 154(b) by 0 days.

(21) Appl. No.: 17/156,428

(22) Filed: Jan. 22, 2021

(65) Prior Publication Data

US 2022/0234122 A1 Jul. 28, 2022

(51) Int. Cl.
*B23D 47/04* (2006.01)
*B27B 9/04* (2006.01)

(52) U.S. Cl.
CPC .............. *B23D 47/04* (2013.01); *B27B 9/04* (2013.01)

(58) Field of Classification Search
CPC ........ B23D 47/04; B23D 47/06; B23D 51/04; B23D 21/14; B23D 21/145; B27B 9/04; B27B 19/14; B27B 21/08; B27B 11/10; B23Q 3/104; B25B 3/00
USPC ............ 30/509; 83/464, 466, 565, 767, 953; 269/2, 10, 103, 104, 105, 156, 171.5, 269/900, 902, 909, 953
See application file for complete search history.

(56) References Cited

U.S. PATENT DOCUMENTS

| | | | | |
|---|---|---|---|---|
| 1,161,001 A | * | 11/1915 | Merritt | B29D 30/48 30/90.3 |
| 1,476,611 A | * | 12/1923 | Hines | B23Q 3/104 269/87.3 |
| 1,535,570 A | * | 4/1925 | Bryant | B23Q 3/104 269/223 |
| 1,954,708 A | * | 4/1934 | Mass | B23Q 3/103 269/297 |
| 2,848,785 A | * | 8/1958 | Bachli | B23Q 3/00 269/127 |
| 3,093,023 A | * | 6/1963 | Vail | B23D 45/122 83/594 |
| 3,840,000 A | * | 10/1974 | Bible | B28D 1/04 125/35 |
| 4,111,180 A | * | 9/1978 | Goodrich | B28D 7/04 125/35 |
| 4,169,400 A | * | 10/1979 | Ducret | H02G 1/1297 83/924 |

(Continued)

FOREIGN PATENT DOCUMENTS

FR 2332098 A1 * 11/1975 ............. B23Q 3/104

OTHER PUBLICATIONS

Honeysett, Elizabeth, Cutting Jump Rings Two Ways, https://www.youtube.com/watch?v=cPza5djNq48, posted Feb. 12, 2017.

(Continued)

*Primary Examiner* — Ghassem Alie
*Assistant Examiner* — Samuel A Davies
(74) *Attorney, Agent, or Firm* — John B. Edel; Edel Patents, LLC

(57) ABSTRACT

Ring cutting jigs are disclosed that include a base; and a sliding brace. The base may include a platform and a pair of arms. A saw guide slot may be positioned within the base. Channels may be included within the base such that the sliding brace may move parallel to the channels with the assistance of pins that ride in those channels. The cooperation of the base and the sliding brace may act to secure a coil between the base and the sliding brace such that the coil may be cut into jump rings.

11 Claims, 4 Drawing Sheets

(56) References Cited

U.S. PATENT DOCUMENTS

| | | | | |
|---|---|---|---|---|
| 4,653,371 | A * | 3/1987 | Vancalbergh | B23D 55/04 |
| | | | | 83/762 |
| 5,038,646 | A * | 8/1991 | Suwitoadji | B23D 55/046 |
| | | | | 144/144.1 |
| 5,556,085 | A * | 9/1996 | Cyr | G02B 25/005 |
| | | | | 269/258 |
| 5,577,717 | A * | 11/1996 | Benson | B25B 5/06 |
| | | | | 269/254 R |
| 5,871,098 | A * | 2/1999 | Storck | B25B 5/08 |
| | | | | 144/286.5 |
| 6,435,497 | B1 * | 8/2002 | Borter | B23Q 3/104 |
| | | | | 269/902 |
| 6,502,810 | B1 * | 1/2003 | Ramoski | B25B 11/00 |
| | | | | 254/133 R |
| 7,950,636 | B2 * | 5/2011 | Kinnison | B25B 5/142 |
| | | | | 269/41 |
| 8,166,860 | B2 * | 5/2012 | Gibbons | B27G 5/023 |
| | | | | 33/537 |
| 2005/0109181 | A1 * | 5/2005 | Zawadzki | B27F 1/005 |
| | | | | 144/144.1 |
| 2010/0170374 | A1 * | 7/2010 | Galas | E06B 9/266 |
| | | | | 83/13 |

OTHER PUBLICATIONS

Smith, David, Jump Ring Making Kit How to Make Jump Rings, https://www.youtube.com/watch?v=QM4wBj8X_9k, May 9, 2020.

Lewis, John, Jump Ring Jig—cut jump rings safely, https://www.etsy.com/listing/58284818/jump-ring-jig-cut-jump-rings-safely?ref=shop_home_active_1, captured Jan. 22, 2021.

* cited by examiner

RING CUTTING JIG

RING CUTTING JIG

Ring cutting jigs described herein may be used in the cutting of rings from coils. Jigs described herein may have particular utility in the cutting of jewelry jump rings from wire coils. Ring cutting jigs described herein may aid in the safe and efficient preparation of many forms of jewelry that utilize rings.

DETAILED DESCRIPTION

Example Set 1

Figure 1:
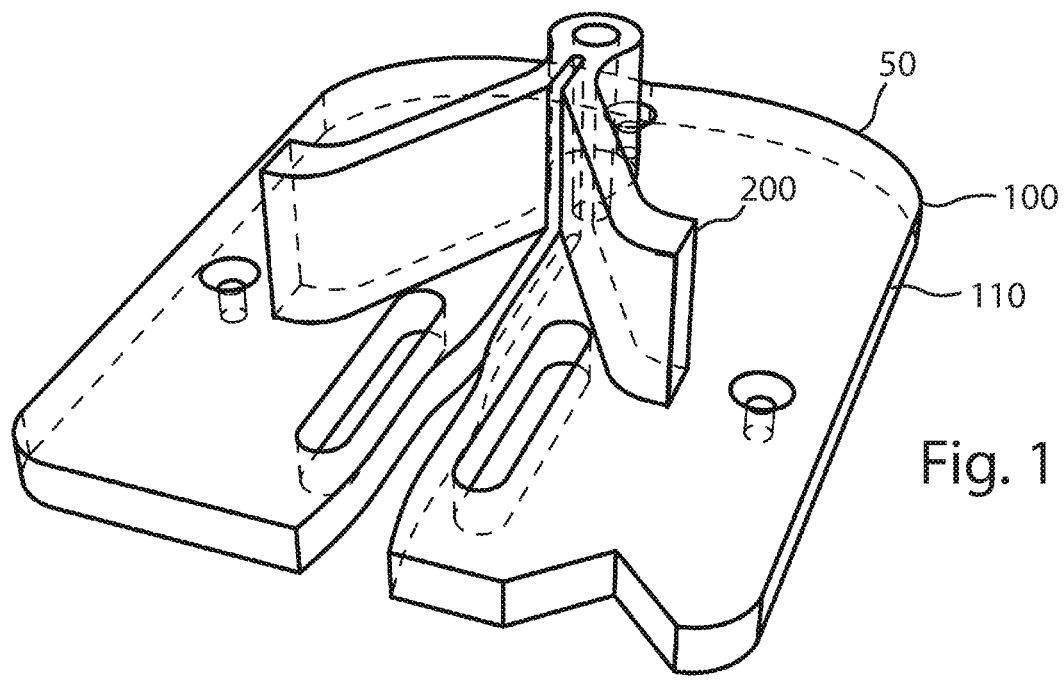
FIG. 1 shows a perspective view of the base.
Figure 2:
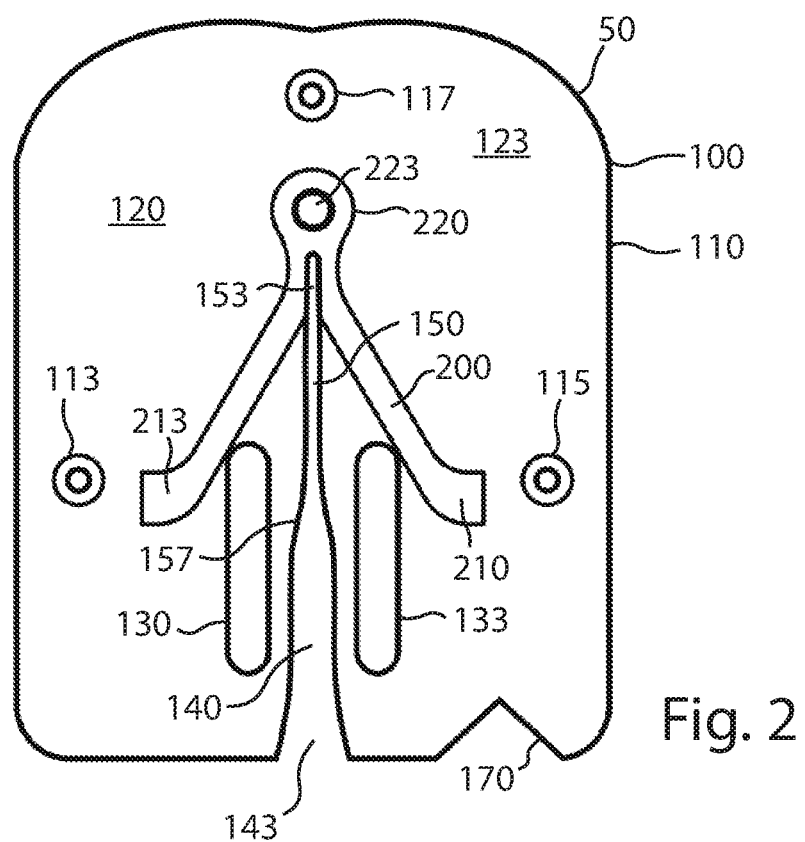
FIG. 2 shows a top/plan view of the base.
Figure 3:
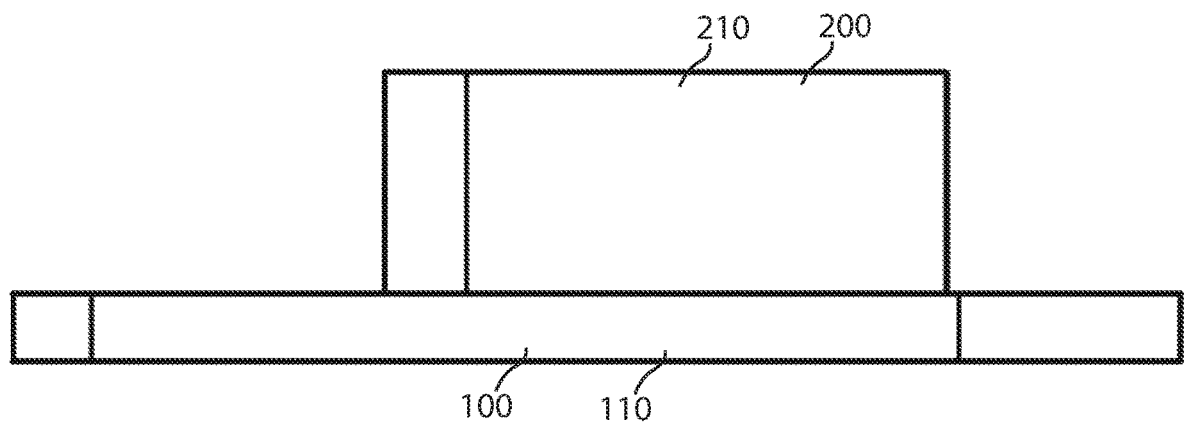
FIG. 3 shows a side view of the base.
Figure 4:
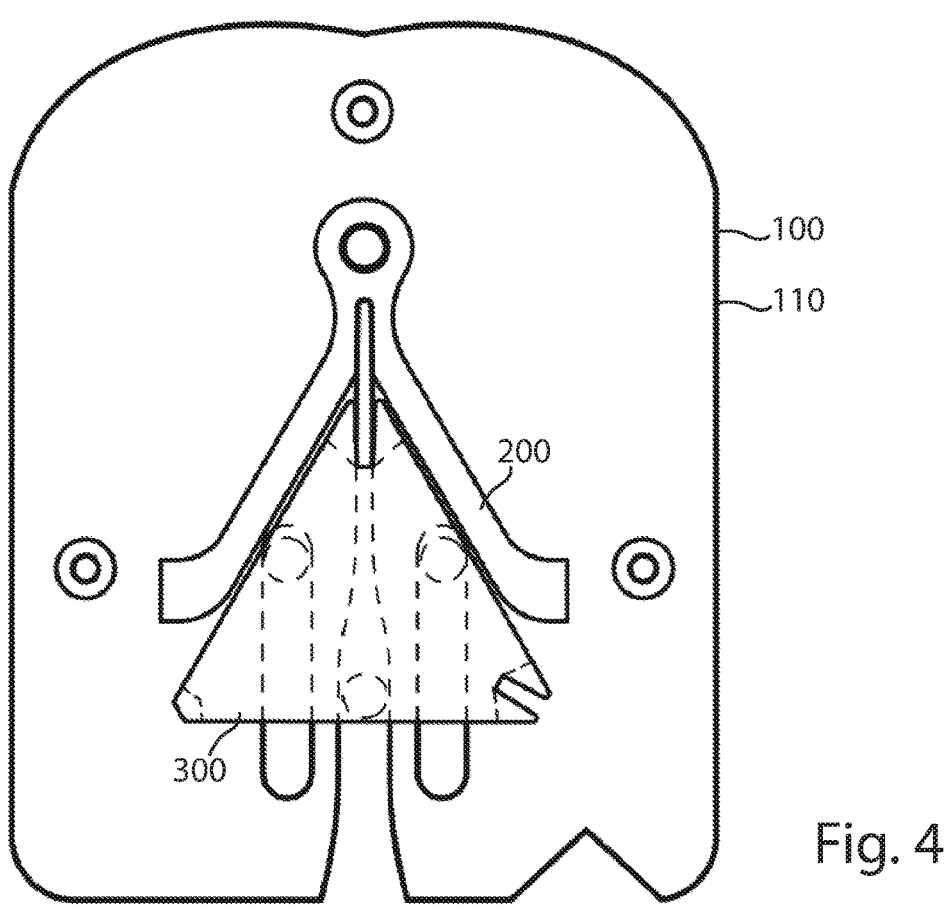
FIG. 4 shows a top/plan view of the ring cutting jig.
Figure 5:
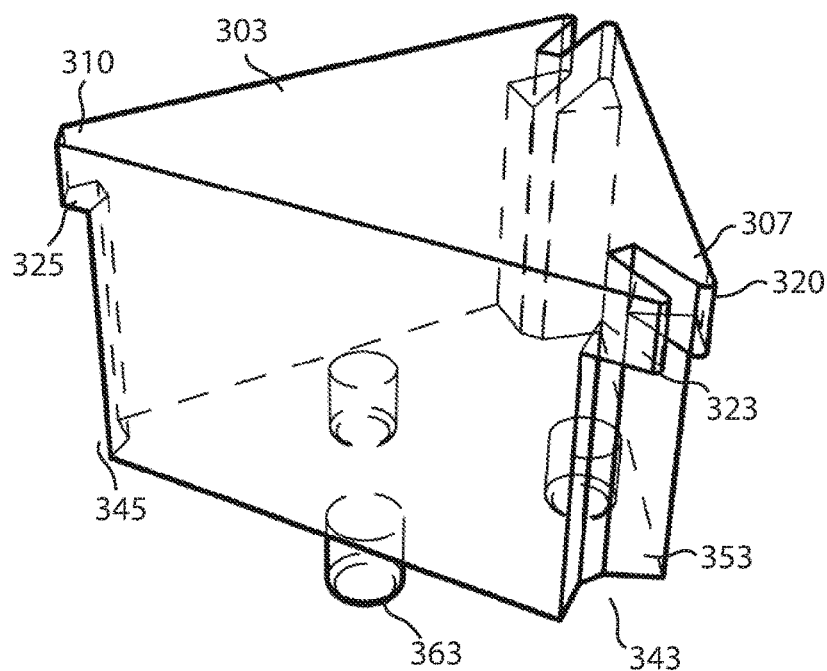
FIG. 5 shows a perspective view of the sliding brace.
Figure 6:
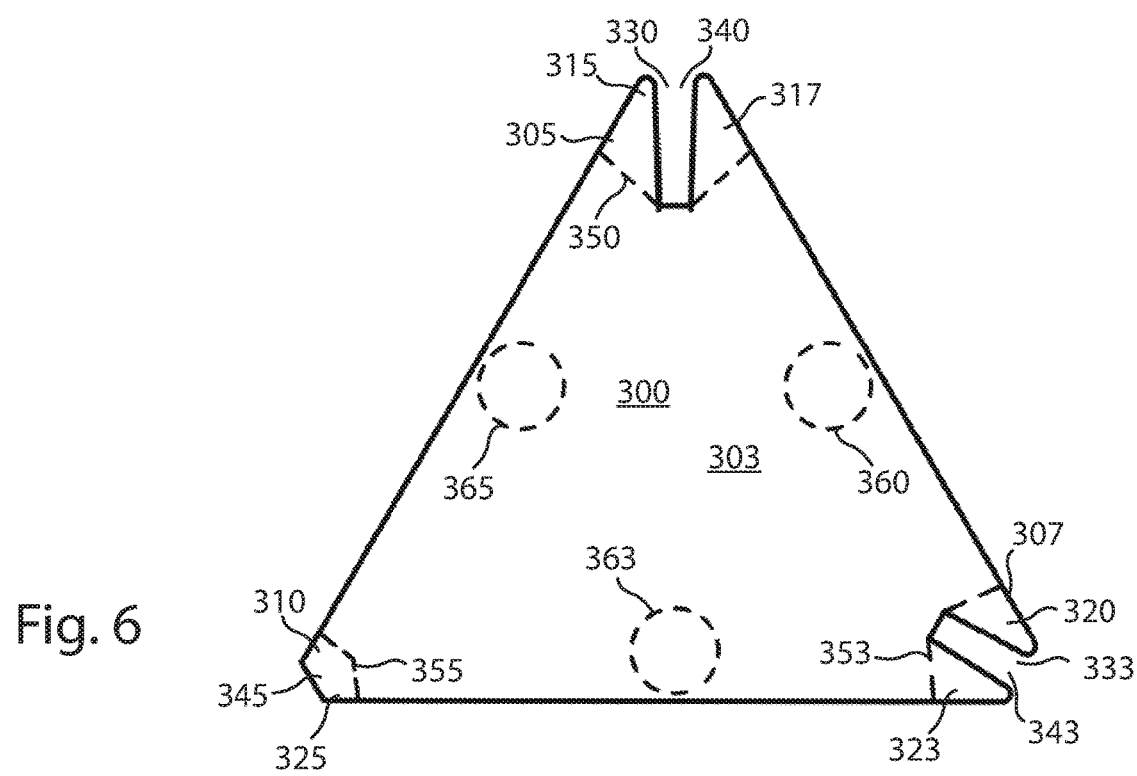
FIG. 6 shows a top/plan view of the sliding brace.
Figure 7:
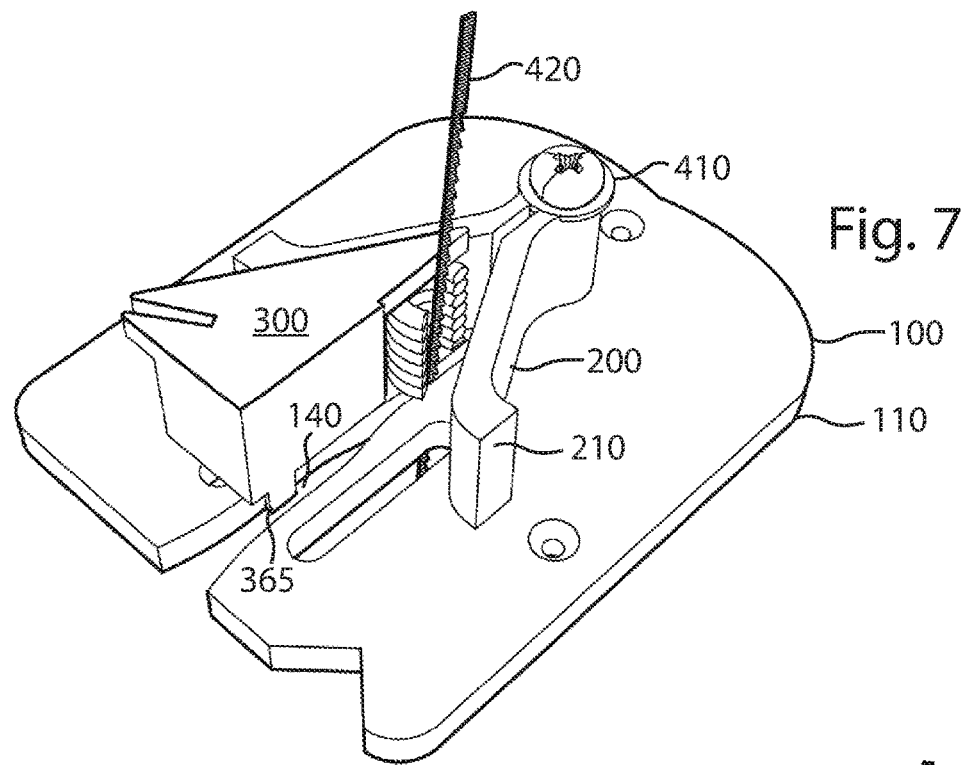
FIG. 7 shows a cutaway perspective view of the ring cutting jig.
Figure 8:
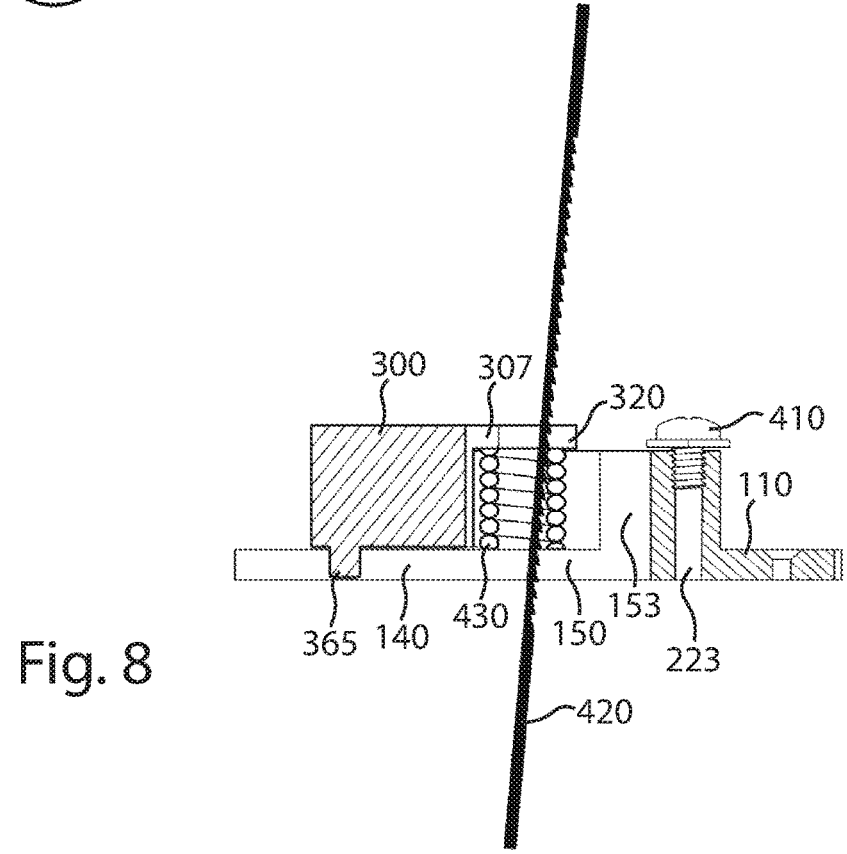
FIG. 8 shows a side cut away view of the ring cutting jig.

Referring now to the figures, ring cutting jig 50 may be comprised of a base 100 and a sliding brace 300. Base 100 may comprise a platform 110 and a cradle 200. Platform 110 and cradle 200 may be a single piece of material. Platform 110 may include first mounting hole 113, second mounting hole 115, third mounting hole 117, clamping area 120, clamping area 123, left guide channel 130, right guide channel 133, center guide channel 140, center guide channel opening 143, saw guide slot 150, saw guide slot finishing area 153, saw guide slot tapered entrance 157. Cradle 200 may include first cradle arm 210, second cradle arm 213, cradle post 220, and cradle post hole 223. Sliding brace 300 may include sliding brace top 303, first sliding brace cap 305, second sliding brace cap 307, third sliding brace cap 310, first sliding brace cap tooth 315, second sliding brace cap tooth 317, third sliding brace cap tooth 320, fourth sliding brace cap tooth 323, fifth sliding brace cap tooth 325, first sliding brace cap tooth slot 330, second sliding brace cap tooth slot 333, first cavity recess space 340, second cavity recess space 343, third cavity recess space 345, first coil rest 350, second coil rest 353, third coil rest 355, first sliding pin 360, second sliding pin 363, and third sliding pin 365. Additional components associated with the ring cutting jig 50 may include protective screw 410, saw blade 420, and ring coil 430.

The preparation of rings generally, metal rings, and jewelry jump rings may be done from the sawing of a coil. That coil is commonly in the form of a helix and is configured in the shape of a spring. Preparation of such coils is commonly done by the winding of wire around a mandrel. The nearly unlimited variation of materials, wire diameter, and coil dimensions are treated generically in this description as "coils" for the materials being cut in the jig and as "rings" for the resulting products of the cuts. As depicted in the figures, ring coil 430 may be representative of coils. Unless described more specifically, those terms should be understood to encompass the wide variety of materials compatible with the jig and cutting methods described herein. Embodiments described herein may allow for the safer, faster, cleaner, more efficient, and more accurate cutting of such coils into rings.

Platform 110 forms the lower stable and mountable portion of base 100. Base 100 may be mounted to a stable surface such as a table or workbench utilizing first mounting hole 113, second mounting hole 115, and third mounting hole 117 utilizing screws or other similar fasteners. Similarly, base 100 may be mounted to a stable surface such as a table or workbench utilizing clamping area 120 and/or clamping area 123 utilizing generally available clamps. Left guide channel 130, right guide channel 133, and center guide channel 140 are designed to accept and interface with first sliding pin 360, second sliding pin 363, and third sliding pin 365 in a sliding relationship. This interface allows sliding brace 300 to slide along platform 110 such that the sliding motion of sliding brace 300 is aligned with the guide channels and such that sliding brace 300 does not rotate at any point along the sliding relationship. Sliding brace 300 is configured to be oriented in one of three directions when interfacing with platform 110. Sliding brace 300 may be oriented such that first sliding brace cap 305 is adjacent to and nearest saw guide slot finishing area 153; sliding brace 300 may be oriented such that second sliding brace cap 307 is adjacent to and nearest saw guide slot finishing area 153; or sliding brace 300 may be oriented such that third sliding brace cap 310 is adjacent to and nearest saw guide slot finishing area 153. Alternating between the three orientations may be accomplished by lifting sliding brace 300 so that the pins clear the channels, rotating sliding brace 300 120° in either direction than reinserting the pins into the channels. Center guide channel opening 143 may be wider than center guide channel 140 for easier acceptance of saw blade 420 or of the pins of sliding brace 300. Positioning saw blade 420 within platform 110 may be done by passing saw blade 420 sequentially through center guide channel opening 143, center guide channel 140, saw guide slot tapered entrance 157, and into saw guide slot 150. Saw guide slot 150 is the initial position for saw blade 420 which would initially be positioned within ring coil 430. Then as saw blade 420 saws through ring coil 430, saw blade 420 emerges into saw guide slot finishing area 153. Saw guide slot tapered entrance 157 allows saw blade 420 to slide easily into proper alignment within saw guide slot 150 for the cutting of ring coil 430.

Cradle 200 may comprise first cradle arm 210 and second cradle arm 213. First cradle arm 210 and second cradle arm 213 act to cradle ring coil 430 into cradle 200 such that ring coil 430 rests against both first cradle arm 210 and second cradle arm 213 and ultimately with the assistance of sliding brace 300, ring coil 430 may be pressed against cradle 200 such that ring coil 430 rests firmly against cradle 200 in the position closest to saw guide slot finishing area 153.

Sliding brace 300 may function such that sliding brace 300 is in contact with platform 110 such that each of first sliding pin 360, second sliding pin 363, and third sliding pin 365 are within one of the associated channels of platform 110 and such that sliding brace top 303 faces away from platform 110. Each of the three ends or tips of sliding brace 300 may be configured to accept a different diameter of ring coil 430 such that a wide variety of rings may be produced. When a ring coil 430 of suitable size is matched to first cavity recess space 340, ring coil 430—having saw blade 420 positioned within ring coil 430—may either be positioned within first cavity recess space 340 or positioned against all three of platform 110, first cradle arm 210, and second cradle arm 213. Sliding brace 300 may then be slid along platform 110 such that ring coil 430 is held firmly against first cradle arm 210, second cradle arm 213, and first coil rest 350. In that position, ring coil 430 is also restrained from significant vertical movement because it lies between first sliding brace cap 305—including first sliding brace cap tooth 315 and second sliding brace cap tooth 317—and platform 110. From that secured position, ring coil 430 may be cut evenly and cleanly. The quality of the cut is aided by the security of ring coil 430 within ring cutting jig 50 along with the combined positioning assistance of saw guide slot 150, saw guide slot finishing area 153, and first sliding brace cap tooth slot 330 which work in combination to guide the saw blade during every portion of the cut.

Second cavity recess space 343 of sliding brace 300 may be used in a manner similar to the use of first cavity recess space 340 described above with second coil rest 353 functioning in a manner equivalent to first coil rest 350. Second sliding brace cap 307 may function in a manner equivalent to first sliding brace cap 305. Both third sliding brace cap tooth 320 and fourth sliding brace cap tooth 323 may function in a manner equivalent to first sliding brace cap tooth 315 and second sliding brace cap tooth 317. Second sliding brace cap tooth slot 333 may function in a manner equivalent to first sliding brace cap tooth slot 330.

Third cavity recess space 345 of sliding brace 300 may be used in a manner similar to the use of first cavity recess space 340 described above with third coil rest 355 functioning in a manner equivalent to first coil rest 350. Third sliding brace cap 310 may function in a manner equivalent to first sliding brace cap 305. Fifth sliding brace cap tooth 325 may function in a manner similar to first sliding brace cap tooth 315 and second sliding brace cap tooth 317 with the exception that first cavity recess space 340 may be configured to fit sizes of ring coil 430 that are dimensionally small enough that having a slot in third sliding brace cap 310 to fit saw blade 420 has limited additional utility.

When ring cutting jig 50 is mounted, the ergonomic use of a saw including saw blade 420 may favor cutting ring coil 430 near the top and adjacent to the sliding brace caps first. The insertion of protective screw 410 into cradle post hole 223 allows for safe entry of saw blade 420 into saw guide slot 150 with limited risk of cutting cradle post 220. For that reason, protective screw 410 may serve both as a protective piece and as a lower cost replaceable sacrificial component.

The full length of platform 110 in the direction of the saw slot may be between 40 and 160 millimeters, in many cases it may be between 70 and 130 millimeters, and may, for example, be 100 millimeters.

The full width of platform 110 perpendicular to the direction of the saw slot may be between 32 and 130 millimeters, in many cases it may be between 57 and 105 millimeters, and may, for example, be 81 millimeters.

The full length of the central slot; including center guide channel 140, center guide channel opening 143, saw guide slot 150, saw guide slot finishing area 153, and saw guide slot tapered entrance 157; may be between 28 and 110 millimeters, in many cases it may be between 48 and 90 millimeters and, may, for example, be 69 millimeters.

The length of saw guide slot 150 including saw guide slot finishing area 153 may be between 13 and 51 millimeters, in many cases it may be between 22, and 42 millimeters and may, for example, be 32 millimeters.

The individual lengths of left guide channel 130 and right guide channel 133 may be between 10 and 42 millimeters, in many cases it may be between 18 and 34 millimeters, and may, for example, be 26 millimeters.

The length of center guide channel 140, excluding center guide channel opening 143, may be between 8 and 32 millimeters, in many cases it may be between 14 and 26 millimeters, and may, for example, be 20 millimeters.

The length of a side of sliding brace 300, from sliding brace cap tooth tip to sliding brace cap tooth tip, may be between 19 and 75 millimeters, in many cases it may be between 33 and 61 millimeters, and may, for example, be 47 millimeters.

The height of sliding brace 300, excluding the height of the pins, may be between 9 and 37 millimeters, in many cases it may be between 16 and 30 millimeters, and may, for example, be 23 millimeters.

The height of the arms above platform 110 may be between 8 and 32 millimeters, in many cases it may be between 14 and 26 millimeters, and may, for example, be 20 millimeters.

The thickness of platform 110 may be between 2 and 10 millimeters, in many cases it may be between 4 and 8 millimeters, and may, for example, be 6 millimeters.

Example Set 2

A set of rings, which may be jewelry jump rings, may be prepared by wrapping a ring coil 430 in painters tape then sliding ring coil 430 over saw blade 420 such that ring coil 430 may loosely slide up and down saw blade 420. The use of the tape may serve to dimensionally stabilize ring coil 430 and may allow for the coil to be tightened or fully compressed during the cutting. Tightly wrapping the tape around ring coil 430 may also allow for a cleaner cut of ring coil 430. Support notch 170 may be used to hold the end of a saw while ring coil 430 is placed on saw blade 420. Saw blade 420 may then be passed through center guide channel opening 143, center guide channel 140, saw guide slot tapered entrance 157, and positioned in saw guide slot 150 with ring coil 430 on platform 110. The user may select an appropriate sliding brace 300 having a cavity recess space designed to accommodate the particular size of ring coil 430 being cut. The user may then orient sliding brace 300 such that the appropriate cavity recess space is oriented toward saw guide slot finishing area 153 when the pins of sliding brace 300 are within the guide channels of platform 110. Sliding brace 300 may then be moved toward saw guide slot finishing area 153 until ring coil 430 is positioned in the appropriate cavity recess space against the coil rest and against the cradle arms of base 100. At that point, ring coil 430 should also be positioned between platform 110 and one of the sliding brace caps of sliding brace 300 further restraining ring coil 430 against movement. Maintenance of a light grasping pressure on ring coil 430 may be accomplished by pressing on the portion of sliding brace 300 opposite saw guide slot finishing area 153. This may be done with a thumb or finger. At that point, ring cutting jig 50 should be firmly grasping ring coil 430. Saw blade 420 may then smoothly cut through ring coil 430. Cutting of ring coil 430 may be done with saw blade 420 leaning slightly forward from perpendicular with platform 110 such that the top of ring coil 430 is cut before the end of ring coil 430 closest to platform 110. The angle of the cut may be 2-5°. The cutting may be done with a jeweler's saw frame and a 0000 blade or a 00000 blade. The kerf thickness of a 0000 jeweler's saw blade is 0.0086 inches, and the kerf thickness of a 00000 jeweler's saw blade is 0.0080 inches. At the conclusion of the cut, saw blade 420 or significant portion of that blade may enter saw guide slot finishing area 153. Ring coil 430 may then be removed from ring cutting jig 50 and the tape removed from ring coil 430 revealing a collection of cut jump rings.

In addition to differing wire gauges and coil diameters, ring coil 430 may take many forms or shapes. Ring coil 430 may have a variety of cross sections including cross sections which are ovals, squares, triangles, and many other forms. The descriptions of these forms are general and are more particularly guided by the type of mandrel on which ring coil 430 is prepared.

It should be understood that sliding brace 300 as depicted in the drawings represents merely one of many potential similar sliding braces. A large number of sliding braces may be used to accommodate coils of varying dimensions and multiple sliding braces may be used with a single base.

Use of the embodiments described herein may allow for steady and consistent cuts of coils to create jump rings and that cutting may help serve to isolate the jeweler's fingers from the saw blade. By allowing the entire cut through the coil to be made without touching either the blade or the coil the embodiments described herein create a safe cutting environment. Ring cutting jig 50 also allows for speed and consistency of cut across a wide range of wire gauges and coil diameters. The invention may be used with a 00000 saw blade.

Ring cutting jig 50 may be arranged and configured to incorporate and cut coil sizes from 2 mm to 36 mm diameter of any gauge of wire.

In an alternate embodiment, ring cutting jig 50 may be secured within a benchtop vice such that clamping area 120 and clamping area 123 are gripped by the vice.

Optionally before inserting ring coil 430 into ring cutting jig 50 ring coil 430 may be wrapped with tape, such as painters tape, which may reduce the chance of individual rings moving to undesirable locations during the cutting of ring coil 430.

As that phrase is used herein "triangular form" indicates a three sided form identifiable as triangular. sliding brace 300 has a triangular form as that phrase is used herein.

Ring cutting jigs described herein may, for example, comprise a base; and a sliding brace; wherein the base comprises a platform, a first arm, and a second arm; wherein a saw guide slot is positioned within the base; wherein a first elongate channel is positioned within the base; wherein the sliding brace comprises a first protrusion and a first rest; wherein the sliding brace is configured to slide parallel to the first elongate channel such that the sliding brace and the base are capable of grasping an elongate object such that: the first arm is in contact with the elongate object along the length of the elongate object, the second arm is in contact with the elongate object along the length of the elongate object, and the first rest is in contact with the elongate object along the length of the elongate object. In a related example, the sliding brace may have a triangular form. In a related example, the first protrusion may be in the form of a pin. In a related example, the first protrusion may be in the form of a first pin; wherein the sliding brace comprises a second pin; and wherein the sliding brace comprises a third pin. In a related example the ring cutting jig may also have a second elongate channel positioned within the base and have a third elongate channel positioned within the base. In a related example, the base may also have a platform and the sliding brace may be arranged and configured so that it may simultaneously contact the platform, the first arm, and the second arm while the first protrusion is within the first elongate channel In a related example, the base may include a plurality of mounting holes. In a related example, the sliding brace may have a first sliding brace saw slot; wherein the base has a first base saw slot; and such that the first sliding brace saw slot aligns with the first base saw slot when the first protrusion is within the first elongate channel In a related example, the first arm may be separated from the second arm by an angle of 60°. In a related example, the sliding brace may have a triangular form and the sides of the triangular form may be in the form of an equilateral triangle. In a related example, the sliding brace may have a first sliding brace saw slot and a second sliding brace saw slot. In a related example, the sliding brace may have a sliding brace cap positioned above a cavity recess space. In a related example, the sliding brace may have a first coil rest, a second coil rest and a third coil rest such that the first coil rest is larger than the second coil rest; and such that the second coil rest is larger than the third coil rest.

The above-described embodiments have a number of independently useful individual features that have particular utility when used in combination with one another including combinations of features from embodiments described separately. There are, of course, other alternate embodiments which are obvious from the foregoing descriptions, which are intended to be included within the scope of the present application.

I claim:
1. A ring cutting jig comprising:
   a: a base; and
   b: a sliding brace;
   c: wherein the base comprises a platform, a first arm, and a second arm;
   d: wherein a saw guide slot is positioned within the base;
   e: wherein a first elongate channel is positioned within the base;
   f: wherein the sliding brace comprises
      i: a first protrusion,
      ii: a first coil rest,
      iii: a second coil rest that is smaller than the first coil rest, and
      iv: a third coil rest that is smaller than the second coil rest;
   g. wherein the sliding brace is configured to slide parallel to the first elongate channel with the first protrusion sliding within the first elongate channel such that the sliding brace and the base are capable of grasping an elongate object such that:
      i: the first arm is in contact with the elongate object along the length of the elongate object,
      ii: the second arm is in contact with the elongate object along the length of the elongate object, and
      iii: the first coil rest is in contact with the elongate object along the length of the elongate object.
2. The ring cutting jig of claim 1 wherein the sliding brace has a triangular form.
3. The ring cutting jig of claim 1 wherein the first protrusion is in the form of a pin.
4. The ring cutting jig of claim 1:
   a: wherein the first protrusion is in the form of a first pin;
   b: wherein the sliding brace comprises a second pin; and
   c: wherein the sliding brace comprises a third pin.
5. The ring cutting jig of claim 1 further comprising a second elongate channel positioned within the base and further comprising a third elongate channel positioned within the base.
6. The ring cutting jig of claim 1 wherein the sliding brace is arranged and configured such that the sliding brace may simultaneously contact the platform, the first arm, and the second arm while the first protrusion is within the first elongate channel.

7. The ring cutting jig of claim 1 wherein the base further comprises a plurality of mounting holes.

8. The ring cutting jig of claim 1 wherein the sliding brace comprises a first sliding brace saw slot; and wherein the first sliding brace saw slot aligns with the saw guide slot positioned within the base when the first protrusion is within the first elongate channel.

9. The ring cutting jig of claim 1 wherein the first arm is separated from the second arm by an angle of 60°.

10. The ring cutting jig of claim 1 wherein the sliding brace comprises a first sliding brace saw slot and a second sliding brace saw slot.

11. The ring cutting jig of claim 1 wherein the sliding brace comprises a sliding brace cap positioned above a cavity recess space which abuts the first coil rest.

* * * * *